Aug. 14, 1951 J. WICKS 2,564,088

GROUP BUSY SIGNALING AT REMOTE TOLL BOARDS

Filed June 18, 1949 3 Sheets-Sheet 1

INVENTOR.
John Wicks
BY Smith, Olsen & Baird
Attys.

GROUP BUSY SIGNALING AT REMOTE TOLL BOARDS

Filed June 18, 1949 3 Sheets-Sheet 2

INVENTOR.
John Wicks
BY
Smith, Olsen & Baird
Attys.

INVENTOR.
John Wicks
BY Smith, Olsen & Baird
Attys.

Patented Aug. 14, 1951

2,564,088

UNITED STATES PATENT OFFICE 2,564,088

GROUP BUSY SIGNALING AT REMOTE TOLL BOARDS

John Wicks, Biloxi, Miss., assignor to Automatic Electric Laboratories, Inc., Chicago, Ill., a corporation of Delaware Application June 18, 1949, Serial No. 100,040

8 Claims. (Cl. 179—27)

The present invention relates in general to supervisory circuit arrangements whereby "group busy" indication is given at distant exchanges whenever a group of toll trunks outgoing from a center, or tandem, exchange to another distant exchange become busy.

In a network of exchanges including a number of distant exchanges and a tandem exchange common to the distant exchanges, an operator in a distant exchange having need for a toll trunk from the tandem exchange to another distant exchange ordinarily must make an attempt to gain access to such a trunk without knowing whether all of the trunks extending from the tandem exchange to the other distant exchange are in use. In the instances where the operator receives busy indication from the tandem exchange when attempting to appropriate a trunk of a group to the other distant exchange, she must make one or more further attempts until a free trunk is obtained. Such repeated unsuccessful attempts result in loss of operator time and the useless occupying of inter-exchange facilities.

It is an object of the invention to improve the above-described conditions in inter-exchange trunking operations by providing a new and useful trunk group busying arrangement wherein a group busy signal, related to a group of trunks from a tandem exchange to a distant exchange, is located in each of the other distant exchanges having access to the related trunk group, and this group busy signal is operated whenever all the trunks of the trunk group are simultaneously in use.

A feature of the invention resides in the novel manner in which a trunk group busy signal in a distant exchange is operated from the tandem exchange over one of the regular trunks from the tandem exchange to the distant exchange.

Another feature of the invention relates to the provision of an improved circuit arrangement in which a trunk group busy indication, individual to each distant exchange, is operated at the tandem exchange whenever all the trunks to the distant exchange are in use.

A further feature of the invention relates to the provision of an improved circuit arrangement at the tandem exchange in which the trunk group busy indication individual to each distant exchange is operated at the tandem exchange over one of the regular trunks between each distant exchange and the tandem exchange.

Still another feature of the invention relates to circuits individual to the trunks over which the trunk group busy indications are sent and which comprises a simplex or a composite circuit for the signalling purposes.

A further feature of the invention resides in the provision of means for delaying the removal, at the tandem exchange, of a trunk group busy signal until after the same group busy signal indication has been removed from all the other distant exchanges, thereby giving operators at the other distant exchange preference to a trunk from the distant exchange individual to the indicated signal when a trunk becomes idle.

Figure 1:
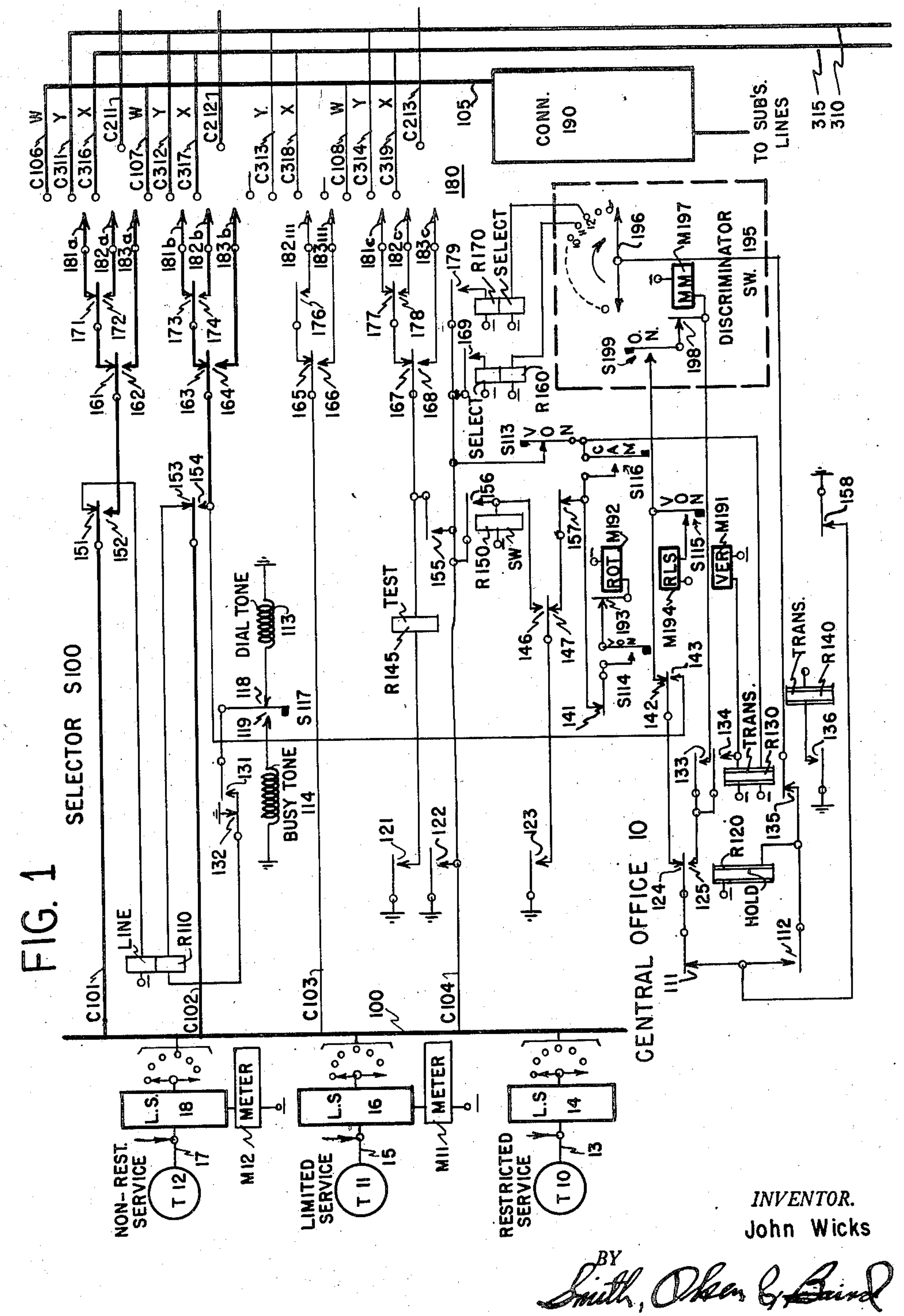
Figure 2:
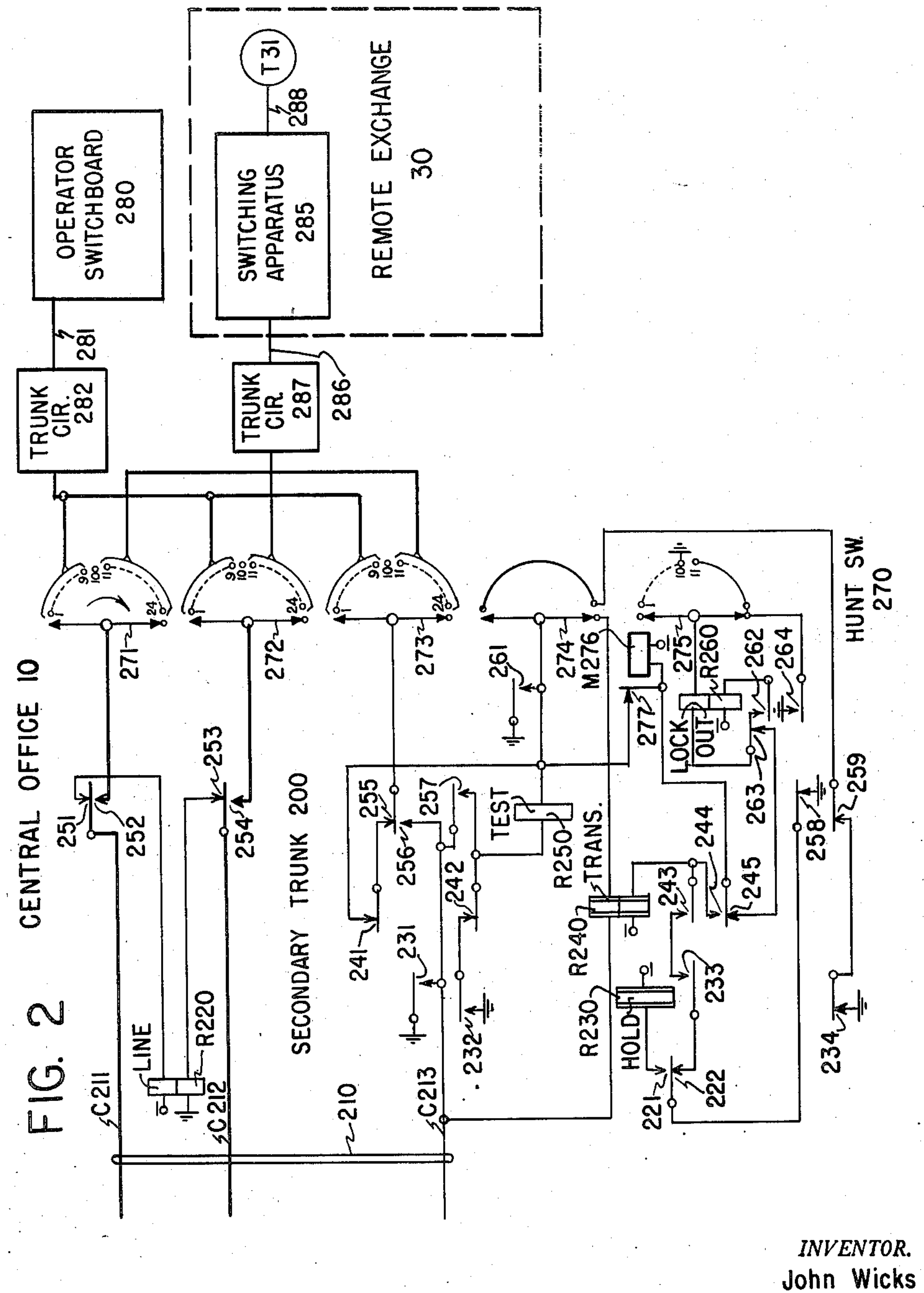
Figure 3:
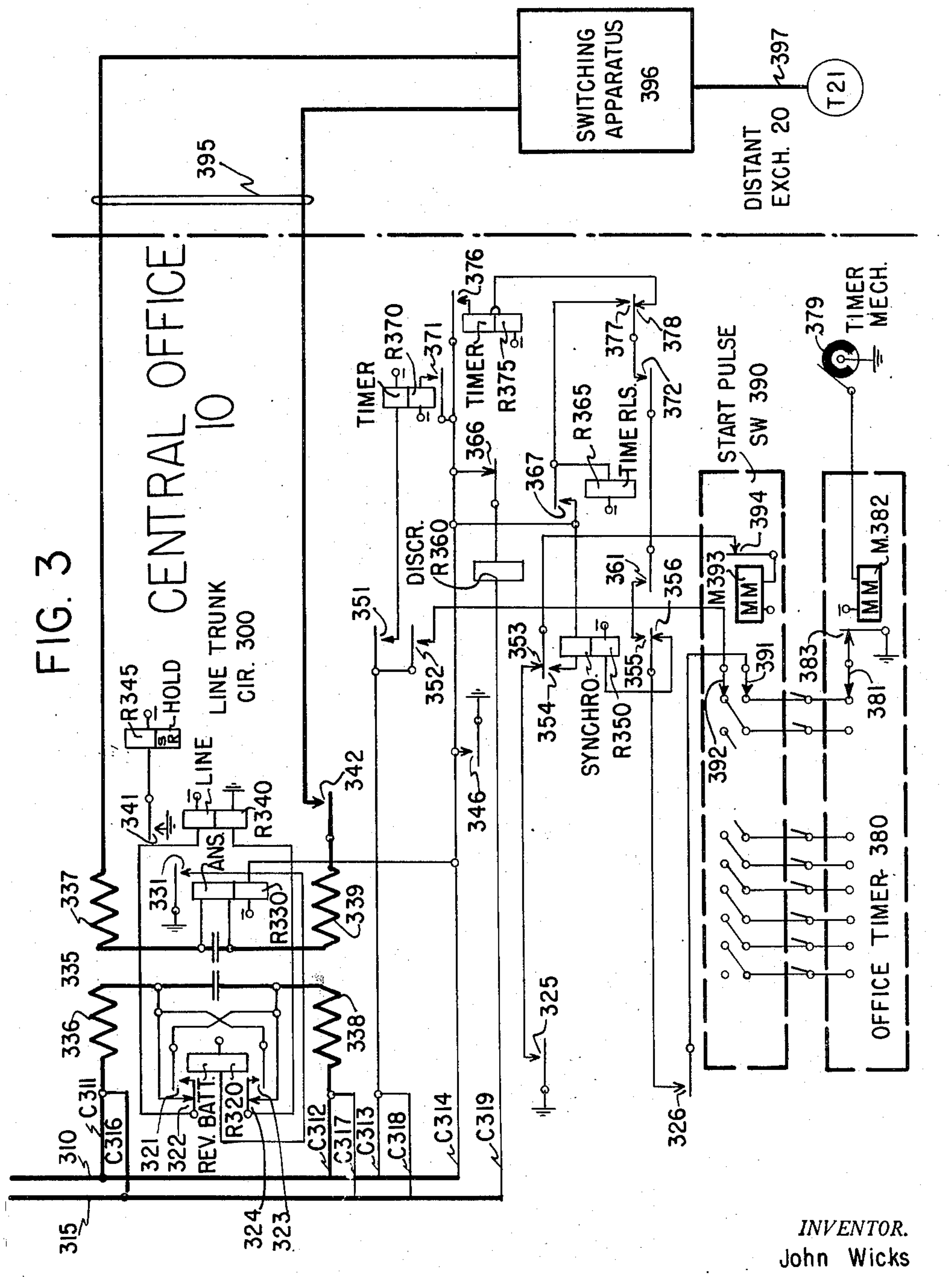

Other objects and features of the invention will become apparent upon a further perusal of the specification taken in conjunction with the accompanying drawings comprising Figures 1 and 2, which show by means of the circuit diagrams a sufficient amount of apparatus to enable the invention to be described and understood.

Referring now to the drawings:

Figure 1 is a single-line circuit diagram in block form showing a tandem exchange A having toll trunks extending to two distant exchanges B and C, and also means for enabling calls initiated in the tandem exchange and in any of the distant exchanges to seize a trunk to one of the terminating exchanges.

Figure 2 shows the tandem exchange A, the two distant exchanges B and C, trunking equipment, trunks, relays and circuits for disclosing the means for causing the operation of related group busy signals in the tandem and distant exchanges. In addition, tandem exchange A shows means for delaying the removal of a group busy signal until after the same corresponding busy signal has been removed from the distant exchanges.

It will be remembered that Figures 1 and 2 show a trunking arrangement somewhat similar to the arrangement disclosed in my prior application filed May 22, 1947, Serial Number 749,758, now Patent No. 2,517,516, granted August 1, 1950, but modified to contain my invention.

Exchange A (Figure 2) shows a plurality of repeaters 34 through 39 terminating trunks from repeaters 31 through 33 and 40 through 42 of exchanges B and C respectively. Only three trunks have been shown between exchange A and exchanges B and C, however any number may be provided.

The repeaters 31—33 of exchange B (Figure 2) are interconnected by means of a chain circuit, which is completed responsive to the last idle repeater being taken into use for indicating at exchange B that all the trunks individual to exchange B are busy. At the same time that the last repeater at exchange B was taken into use, the last repeater of the group 34—36 in exchange A was taken into use, thereby completing a chain circuit for operating equipment at exchange A which subsequently completes circuits for indicating at exchanges A and C that all trunks individual to exchange B are in use. A similar arrangement of repeaters and their chain circuits are provided for exchange C and operate in a like manner for indicating at all the exchanges that all the trunks individual to exchange C are in use. While only three exchanges have been shown for the sake of simplicity, it will be understood that any number of exchanges may be arranged in a like manner, depending on the requirements or preference. It will also be understood that since applicant's invention will universally function with any common, or well-known, type of telephone equipment, it has been considered as unnecessary to detail any particular arrangement in this disclosure. Therefore, the block diagram shown in Figure 1 shows a trunking arrangement in which one method of a practical application of the invention will be used, as shown more in detail in Figure 2.

As shown in Figure 2, the trunk T89, which is individual to exchange B, is shown as being the one over which the group busy indication is received when all the trunks individual to exchange C are in use. If other distant exchanges (not shown) are to be included in the arrangement, the other trunks such as T87 and T88, which are also individual to exchange B, are arranged similar to trunk T89 and additional equipment is provided in the tandem exchange A so that exchange B will receive the group busy indications from the other distant exchanges when all of the trunks individual to each of them are in use. A similar arrangement is provided for exchange C, wherein trunk T99 is used in a like manner for receiving the group busy indication that all the trunks individual to exchange B are in use. The trunks T97 and T98 can also be used for purposes similar to those mentioned for trunks T87 and T88.

The circuit arrangement shown in trunks T89 and T99 for receiving the group busy signal may be described as a simplex circuit, in which a direct current potential is used as the signalling current and which is superimposed upon the two trunk conductors by means of center taps provided at repeating coils 78 and 79, and 80 and 81 respectively. If desired, a composite circuit may be substituted in place of the simplex, in which the direct current potential is transmitted to the distant exchange over only one of the trunk conductors.

The tandem exchange A of Figure 2 shows one method for delaying the removal of the group busy signal received from exchange C and a different method of delaying the removal of the group busy signal as received from exchange B. Additional distant exchanges may use either type, dependent on their requirements. The delay in the extinguishing of lamp 7 (which is individual to exchange C) will include the release time of relay 24 plus the release time of slow-to-release relay 27. The delay in the extinguishing of lamp 6 (which is individual to exchange B) will include the release time of relay 21, plus the release time of relay 13, plus the time that the weighted armature ceases to maintain relay 18 energized by vibrating and plus the release time of the slow-to-operate relay 18.

Having briefly described the equipment and apparatus, a detailed description of the operation will follow.

It will first be assumed that the last idle trunk of the group connecting exchange A to exchange C has been taken into use, and that the last trunk taken into use is designated at T97.

As soon as the trunk T97 is taken into use, circuits (not shown) are completed for chain relays 63 and 69 of repeaters 37 and 40 respectively. Since it has been stated that the other trunks such as T98 and T99 are in use, the chain relays of their respective repeaters will be operated. Therefore, as relay 69 operates contacts 70, an obvious circuit is completed for illuminating the lamp 8 at toll board 3 of exchange C. In operating contacts 64, relay 63 completes an obvious circuit for relay 24.

In operating contacts 25, relay 24 completes an obvious circuit to relay 27 at exchange A, while at contacts 26 a circuit is completed for relay 11 in exchange B, which may be traced from ground through the winding of relay 11, the center tap and right-hand winding of repeater coil 78, both conductors of trunk T89, the left-hand winding and center tap of repeating coil 79, conductor 85, contacts 26 and through the resistance to battery.

Since relay 27 is constructed as being slow-to-release, it will also be slightly slow-to-operate. Relay 11 will therefore operate first and at contacts 12 will complete an obvious circuit for lamp 4 at toll board 2, of exchange B, thereby indicating to the operator at exchange B that all the trunks between exchange A and exchange C are in use.

In operating contacts 28, relay 27 completes an obvious circuit for lamp 7 at toll board 1, of exchange A, thereby indicating to the operator at exchange A that all the trunks between exchange A and exchange C are in use.

Assuming now that the operator at exchange B desires to place a call to a subscriber in exchange C, by observing her indicator panel at her toll board 2 she will note that the lamp 4 is illuminated and since this indicates that all the trunks between exchange A and exchange C are busy, it will be useless to try and connect with exchange C at the present.

This condition exists until one of the trunks of exchange C become idle. Assuming, for example, that the trunk T98 is restored to its idle condition, chain relays 65 and 71 will restore simultaneously and at their respective contacts 66 and 72 will open the chain circuits to relay 24 and lamp 8 respectively. The extinguishing of lamp 8 removes the trunk group busy indication from the toll board 3, of exchange C, while the restoring of relay 24 opens the previously traced circuits of relays 27 and 11 at contacts 25 and 26 respectively. Since relay 27 is constructed as being slow-to-release, relay 11 will restore first. At contacts 12, relay 11 opens the circuit to lamp 4, thereby indicating to the operator at exchange B that a trunk is now available at exchange C and that she may proceed to place her call. After a normal interval, relay 27 restores and at contacts 28 opens the circuit to lamp 7 to remove the trunk group busy signal of exchange C from the toll board 1 of exchange A.

It will thus be seen that due to the delay in removing the trunk group busy signal at exchange A, the operator at the distant exchange B has been given preference over the operator at exchange A for access to the first idle trunk of exchange C after removal of a group busy indication.

Conditions will now be described under which the second type of delaying means at exchange A will be operated.

Assuming in this case, that all the trunks between exchange A and exchange B are in use, the combined operation of chain relays 51, 53 and 55 will complete a chain circuit for lamp 5 for indicating to the operator at toll board 2 of exchange B that all trunks are in use. Chain relays 57, 59 and 61 will likewise operate and complete a chain circuit for the relay 21.

In operating contacts 22, relay 21 completes an obvious circuit to relay 13 and at contacts 23 completes a circuit to relay 29 over a path similar to the one previously traced for relay 11.

In operating, relay 13 attracts the weighted armature 15 toward its core and closes contacts 16 and 17, thereby completing an obvious circuit for relay 18. Since relay 18 is constructed as being slow-to-operate, relay 29 operates next and at contacts 30 completes a circuit to lamp 9 for indicating to the operator at toll board 3, of exchange C, that all the trunks between exchange A and exchange B are in use. After a normal interval, relay 18 operates, which at contacts 19 completes its own locking circuit and at contacts 20 completes a circuit to the lamp 6 for indicating to the operator at toll board 1, of exchange A, that all the trunks between exchange A and exchange B are in use.

Assuming now that the operator at exchange C desires to place a call to a subscriber in exchange B, by observing her indicator panel at her toll board 3 she will note that the lamp 9 is illuminated and since this indicates that all the trunks between exchange A and exchange B are busy, it will be useless to try and connect with exchange B at the present.

This condition exists until one of the trunks of exchange B become idle. Assuming, for example, that the trunk T88 is restored to its idle condition, chain relays 53 and 59 will restore simultaneously and at their respective contacts 54 and 60 will open the chain circuits to lamp 5 and relay 21 respectively. The extinguishing of lamp 5 removes the trunk group busy indication from the toll board 2, of exchange B, while the restoring of relay 21 opens the previously traced circuits of relays 13 and 29 at contacts 22 and 23 respectively. Relay 13 restores and the contact spring pressure of contacts 16 and 17 previously applied against the weighted armature 15 now causes the armature to vibrate, or swing back and forth, and alternately engage contact springs 14 and 16, thereby maintaining relay 18 energized for the present over its locking circuit. Relay 29 now restores and at contacts 30 opens the circuit to lamp 9 for indicating to the operator at exchange C that a trunk is now available at exchange B and that she may proceed to place her call. After a certain interval of time, the swing of the weighted armature 15 has decreased to the point that it no longer touches contact springs 14 and 16, thus opening the circuit to relay 18. The slow-to-operate structure of relay 18 makes it slightly slow-to-release. After a normal time, relay 18 restores to open its locking circuit at contacts 19 and open the circuit to lamp 6 at contacts 20 for removing the trunk group busy signal of exchange B from the toll board 1 of exchange A.

It will thus be seen that due to the delay in removing the trunk group busy signal at exchange A, the operator at the distant exchange C has been given preference over the operator at exchange A for access to the first idle trunk of exchange B after removal of a group busy indication.

It will be noted that the time interval of the last-described delaying means in the removing of the trunk group busy indication will be much longer than the first described delaying means, thus providing means for maintaining a choice of two different time intervals for enabling distant exchanges to have preference to trunks of other distant exchanges, dependent upon their requirements and importance.

Having described my invention, what is considered new and desired to have protected by Letters Patent will be pointed out in the appended claims.

What is claimed is:

1. In a telephone system, first and second distant exchanges, a tandem exchange, trunks from said tandem exchange to both said distant exchanges, a plurality of supervisory signals at each of said distant exchanges and said tandem exchange, each of said supervisory signals at each exchange corresponding to a different distant exchange, a first and a second simplex signalling circuit included in one of the trunks between said tandem exchange and each of said first and second distant exchanges respectively, relay means including chain relays operated responsive to the simultaneous occupancy of all said trunks of said first exchange for operating the supervisory signal at said tandem exchange corresponding to said first exchange, contacts controlled by said relay means for completing said second simplex signalling circuit, a relay at said second exchange operated responsive to the completion of said second simplex signalling circuit for operating the supervisory signal at said second exchange corresponding to said first exchange, other relay means including other chain relays operated responsive to the simultaneous occupancy of all trunks of said second exchange for operating the supervisory signal at said tandem exchange corresponding to said second exchange, other contacts controlled by said other relay means for completing said first simplex signalling circuit, and a relay at said first exchange operated responsive to the completion of said first simplex signalling circuit for operating the supervisory signal at said first exchange corresponding to said second exchange.

2. In a telephone system, a plurality of distant exchanges, a tandem exchange, trunks from said tandem exchange to each of said distant exchanges, a plurality of supervisory signals in each of said exchanges, each of said signals at each exchange corresponding to a different distant exchange, means operated responsive to the simultaneous occupancy of all of said trunks of one of said distant exchanges for operating the supervisory signal corresponding to said one exchange at all of said exchanges for indicating to all of said exchanges that all trunks of said one exchange are busy, said means restored responsive to one of the trunks of said one exchange becoming idle for restoring the operated signal at each of said distant exchanges, and delaying means included in said means and controlled responsive to the restoring of said means for maintaining the operated signal at said tandem exchange operated for a predetermined interval of time after all said signals at said distant exchanges have restored.

3. In a telephone system, first and second distant exchanges, a tandem exchange, trunks from said tandem exchange to both said distant exchanges, a plurality of supervisory signals at each of said distant exchanges and said tandem exchange, each of said supervisory signals at each exchange corresponding to a different distant exchange, circuit means including chain relays operated responsive to a simultaneous occupancy of all of said trunks of one of said distant exchanges for operating the corresponding supervisory signal at said one distant exchange to indicate to said one exchange that all its trunks are busy, a first relay in said tandem exchange, other means operated responsive to said simultaneous occupancy of all said trunks of said one distant exchange for operating said first relay, relay means, a simplex signalling circuit completed responsive to said first relay operation for operating said relay means, a circuit controlled by said operated relay means for operating the supervisory signal corresponding to said one exchange at the other of said distant exchanges to indicate to said other distant exchange that all said trunks to said one distant exchange are busy, a second relay operated responsive to the operation of said first relay, and a circuit controlled by said second relay for operating the supervisory signal corresponding to said one exchange at said tandem exchange to indicate to said tandem exchange that all said trunks to said one distant exchange are busy.

4. In a telephone system including a first, a second and a tandem exchange, a first group of trunks interconnecting said first and tandem exchanges, a second group of trunks interconnecting said second and tandem exchanges, switching apparatus for completing telephone interconnections over said trunks between said exchanges, a supervisory signal at each of said exchanges individual to said first group of trunks, a supervisory signal at each of said exchanges individual to said second group of trunks, a first simplex circuit superimposed on one of said trunks of said first group, a second simplex circuit superimposed on one of said trunks of said second group, relay circuit means operated in response to all said first group of trunks becoming busy for operating said supervisory signals at said first and tandem exchanges individual to said first trunk group and for operating said supervisory signal at said second exchange individual to said first trunk group over said second simplex circuit to indicate the all-trunk-busy condition of said first trunk group, and additional relay circuit means operated in response to all said trunks of said second group becoming busy for operating said supervisory signals at said second and tandem exchanges individual to said second trunk group and for operating said supervisory signal at said first exchange individual to said second trunk group over said first simplex circuit to indicate the all-trunk-busy condition of said second trunk group.

5. In a telephone system, first and second distant exchanges, a tandem exchange, trunks from said tandem exchange to both said distant exchanges, a plurality of supervisory signals at each of said distant exchanges and said tandem exchange, each of said supervisory signals at each exchange corresponding to a different distant exchange, a first and a second simplex signalling circuit included in one of the trunks between said tandem exchange and each of said first and second distant exchanges respectively, means controlled responsive to the simultaneous occupancy of all said trunks of said first exchange for operating the supervisory signal at said tandem exchange corresponding to said first exchange and for completing said second simplex signalling circuit, a relay at said second exchange operated responsive to the completion of said second simplex signalling circuit for operating the supervisory signal at said second exchange corresponding to said first exchange, means controlled responsive to the simultaneous occupancy of all trunks of said second exchange for operating the supervisory signal at said tandem exchange corresponding to said second exchange and for completing said first simplex signalling circuit, a relay at said first exchange operated responsive to the completion of said first simplex signalling circuit for operating the supervisory signal at said first exchange corresponding to said second exchange, and a slow-to-release relay in said first means and effective upon the release of said first means in response to a trunk of said first exchange becoming idle for delaying the restoring of the operated supervisory signal, corresponding to said first exchange, at said tandem exchange for a predetermined interval of time.

6. In a telephone system, first and second distant exchanges, a tandem exchange, trunks from said tandem exchange to both said distant exchanges, a plurality of supervisory signals at each of said distant exchanges and said tandem exchange, each of said supervisory signals at each exchange corresponding to a different distant exchange, a first and a second simplex signalling circuit included in one of the trunks between said tandem exchange and each of said first and second distant exchanges respectively, means controlled responsive to the simultaneous occupancy of all said trunks of said first exchange for operating the supervisory signal at said tandem exchange corresponding to said first exchange and for completing said second simplex signalling circuit, a relay at said second exchange operated responsive to the completion of said second simplex signalling circuit for operating the supervisory signal at said second exchange corresponding to said first exchange, means controlled responsive to the simultaneous occupancy of all trunks of said second exchange for operating the supervisory signal at said tandem exchange corresponding to said second exchange and for completing said first simplex signalling circuit, a relay at said first exchange operated responsive to the completion of said first simplex signalling circuit for operating the supervisory signal at said first exchange corresponding to said second exchange, and said last means including a slow-to-operate relay and a control relay having weighted armature for controlling said slow-to-operate relay, said control relay effective upon the release of said last means in response to a trunk of said second exchange becoming idle for releasing said weighted armature to restore to normal in pendulum type motion of ever diminishing arcs, said armature motion maintaining said slow-to-operate relay energized a predetermined interval of time for delaying the restoring of the operated supervisory signal, corresponding to said second exchange, at said tandem exchange.

7. In a telephone system including a first, a second and a tandem exchange, a first group of trunks interconnecting said first and tandem exchanges, a second group of trunks interconnecting said second and tandem exchanges, switching apparatus in said tandem exchange for completing telephone connections over said trunks between said exchanges, relay means in said tandem exchange operative in response to all said first group of trunks becoming busy, a simplex circuit superimposed on one of said trunks in said second group, a supervisory signal at said second exchange, means controlled over said simplex circuit in response to the operation of said relay means for operating said supervisory signal to indicate the all-trunk-busy condition of said first group trunks at said second exchange, a supervisory signal at said tandem exchange, circuit means completed in response to the operation of said relay means for operating said supervisory signal at said tandem exchange to indicate the all-trunk-busy condition of said first group trunks at said tandem exchange, and delay means included in said circuit means for delaying the restoration of said signal at said tandem exchange for a predetermined time interval after the restoration of said supervisory signal at said second exchange in response to the removal of the all-trunk-busy condition of said first group trunks.

8. In a telephone system including a first, a second and a tandem exchange, a first group of trunks interconnecting said first and tandem exchanges, a second group of trunks interconnecting said second and tandem exchanges, switching apparatus for completing telephone connections over said trunks between said exchanges, a supervisory signal at each of said exchanges individual to said first group of trunks, a supervisory signal at each of said exchanges individual to said second group of trunks, a first simplex circuit superimposed on one of said trunks of said first group, a second simplex circuit superimposed on one of said trunks of said second group, relay circuit means operated in response to all said first group of trunks becoming busy for operating said supervisory signals at said first and tandem exchanges individual to said first trunk group and for operating said supervisory signal at said second exchange individual to said first trunk group over said second simplex circuit to indicate the all-trunk-busy condition of said first trunk group, additional relay circuit means operated in response to all said trunks of said second group becoming busy for operating said supervisory signals at said second and tandem exchanges individual to said second trunk group and for operating said supervisory signal at said first exchange individual to said second trunk group over said first simplex circuit to indicate the all-trunk-busy condition of said second trunk group, and time delaying means for delaying the restoration of the supervisory signals in said tandem exchange until after the restoration of said supervisory signals in said first and second exchanges in response to the removal of the all-trunk-busy condition of said trunk groups.

JOHN WICKS.

REFERENCES CITED

The following references are of record in the file of this patent:

UNITED STATES PATENTS

| Number | Name | Date |
|---|---|---|
| 2,476,888 | Mitchell | July 19, 1949 |

Certificate of Correction

Patent No. 2,564,088 August 14, 1951

JOHN WICKS

It is hereby certified that error appears in the above numbered patent requiring correction as follows:

Strike out the drawings, comprising Sheets 1, 2, and 3, and insert Sheets 1 and 2, as shown below—

Aug. 14, 1951 J. WICKS 2,564,088

GROUP BUSY SIGNALING AT REMOTE TOLL BOARDS

Filed June 18, 1949 2 Sheets-Sheet 1

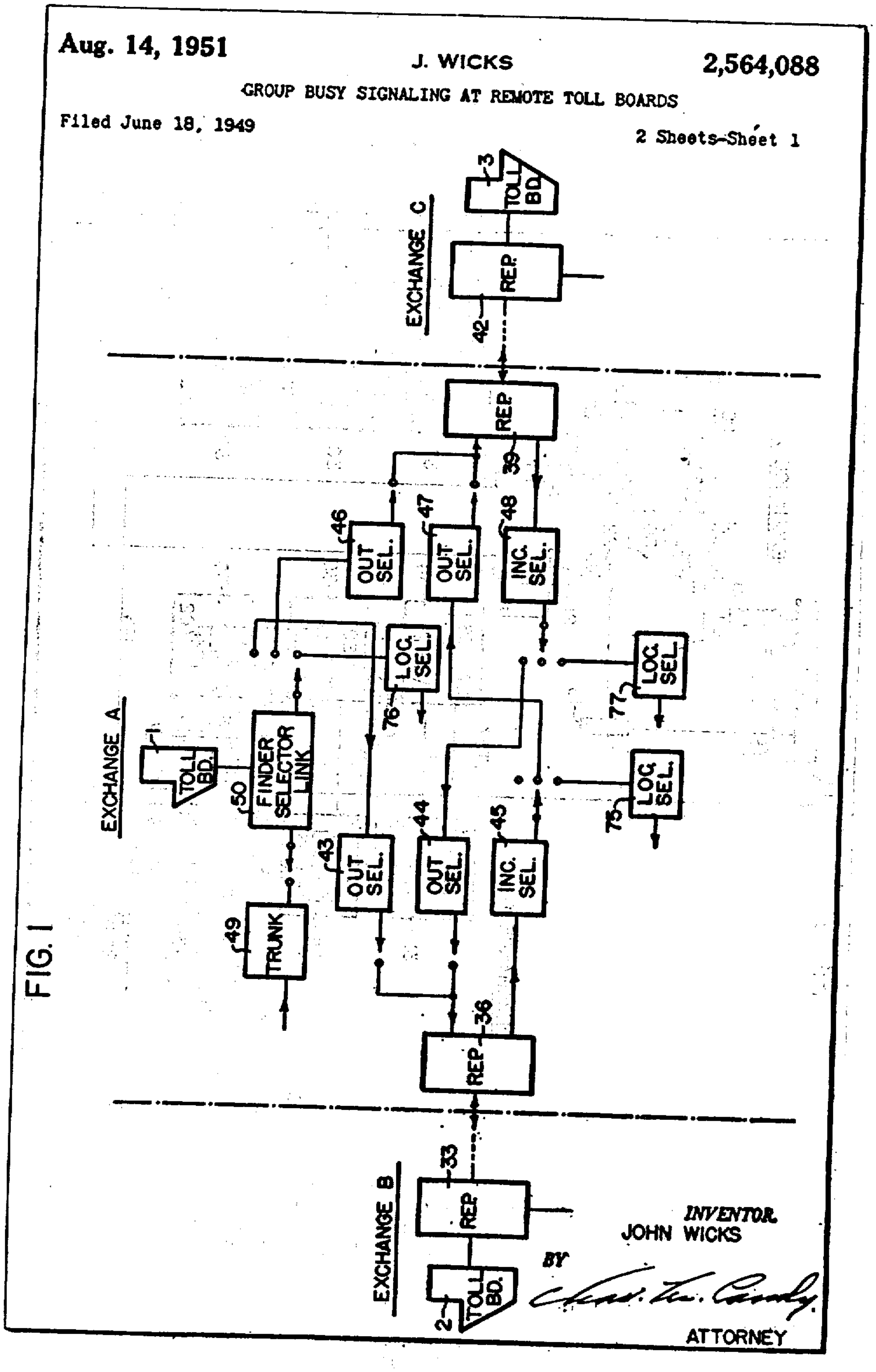

FIG. 1

INVENTOR.
JOHN WICKS
BY
ATTORNEY

Aug. 14, 1951 J. WICKS 2,564,088
GROUP BUSY SIGNALING AT REMOTE TOLL BOARDS
Filed June 18, 1949 2 Sheets-Sheet 2

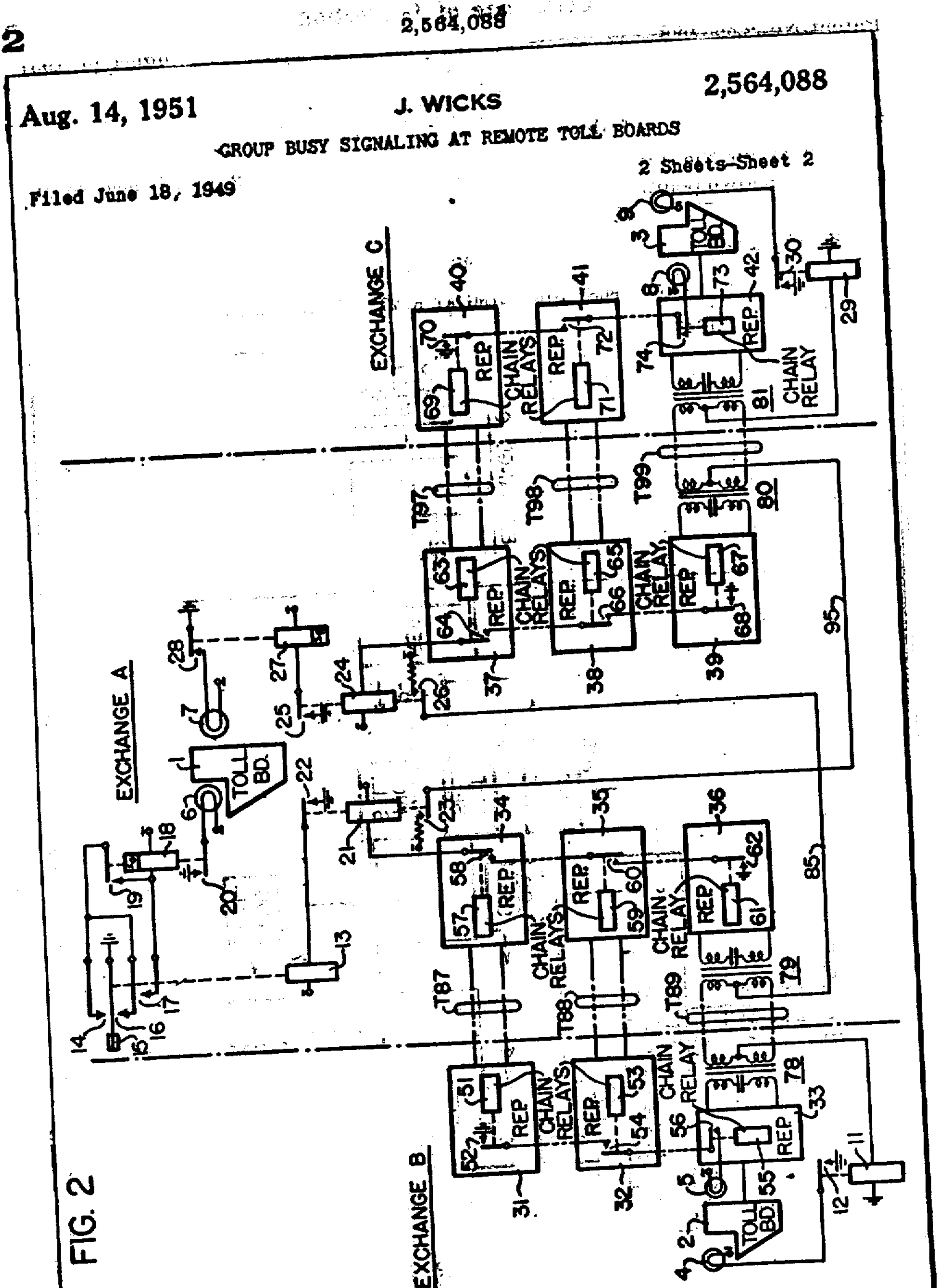

FIG. 2

INVENTOR.
JOHN WICKS
BY [signature]
ATTORNEY and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*